Dec. 7, 1965          K. W. FOSTER          3,222,634
UNDERWATER LOCATING DEVICE
Filed July 27, 1962

INVENTOR
K. W. FOSTER
BY: *Theodore E. Bieber*
HIS ATTORNEY

United States Patent Office 3,222,634
Patented Dec. 7, 1965

3,222,634
UNDERWATER LOCATING DEVICE
Kenneth W. Foster, Houston, Tex., assignor to Shell Oil Company, New York, N.Y., a corporation of Delaware
Filed July 27, 1962, Ser. No. 212,826
2 Claims. (Cl. 340—3)

This invention pertains to locating devices and more particularly to a method and apparatus for accurately locating the position of an underwater object.

In many underwater operations it is necessary to accurately locate the position of an object. For example, in the drilling of underwater oil wells it is necessary to locate the underwater wellhead in order that the drill string may be reinserted into the well. In the past this problem has been solved by extending the wellhead structure to the surface or close enough to the surface to permit divers to readily locate the wellhead. An additional solution has been to join the underwater wellhead to the surface by means of a casing or conductor pipe. In the past no attempt has been made to position the wellhead directly on the floor of the water body and then locate it by various devices.

In addition to locating submerged underwater wellheads it is necessary in many marine operations to accurately locate various objects. For example, at times it is necessary to locate buried pipe lines or sunken vessels and the like. Likewise, in various salvage operations it is necessary to locate the various parts of an object that are scattered over a wide area.

Accordingly, it is the principle of this invention to provide a method and apparatus for rapidly locating the exact position of an object submerged below the surface of a body of water.

It is a further object of this invention to provide a method and apparatus for locating submerged underwater objects that utilizes a source of pulsed energy and two or more receiving means. The receiving means are equally spaced from the source of the pulse energy to permit the measuring of the time interval required for the pulsed energy to travel from the source to the object and be reflected back to the receivers. Thus, by comparing the travel times one can locate the underwater object.

A still further object of this invention is to provide a method and apparatus for rapidly locating submerged underwater wellheads in which the wellhead is fitted with a reflector of pulsed energy and a source of pulsed energy is supported in the water below the surface thereof. At least two receivers spaced equal distance on opposite sides of the source of pulsed energy are used for receiving the energy that is reflected back from the wellhead. By measuring the travel time from the source to the wellhead and back to the two receivers one can determine whether the receivers are spaced equal distance from the wellhead.

The above objects and advantages of this invention are achieved by providing a device which can be lowered from the surface of the water and rotated through 360°. For example, the device may be the wellhead connector suspended on a drill string which is lowered from the drill rig located on the drilling vessel. Disposed on the bottom of the device at its center is a source of pulsed energy, for example, a source of sonic energy such as a magnetostrictive transducer. Also located on the device are at least two receivers that are capable of receiving the pulsed energy and converting it to related electrical signals. The receivers are disposed on diametrically opposite sides of the source of pulsed energy and located equal distances therefrom. The object to be located, for example the wellhead, is preferably fitted with a device that is capable of reflecting the pulsed energy.

By measuring the travel time from the source to the wellhead and back to each of the two receivers one can determine whether the receivers are spaced equal distances from the wellhead. If the travel times are not identical the support holding the receivers can be rotated until the travel time from the source to the wellhead and back to the receivers are identical. In this position a line drawn between the two receivers will be perpendicular to the direction to the well. By knowing the exact location of the receivers on the underwater support relative to the surface position of the pipe or other member supporting the receivers the heading to the wellhead can be obtained. By turning the receiver support 90° and determining which receiver receives the sound first the direction to the wellhead can be further defined. It is obvious that with two spaced receivers equal distances from an object reflecting sound pulses the travel time of the pulse will be the same. When following the direction indicated by the first received sound signal the difference in travel time from the sound to the two receivers will remain contant until the sound reflector comes between the two receivers. When the sound travel times become equal the reflector will be immediately below the center of the receivers. It is possible that the receivers may have been moved to another point where they are an equal distance from the reflector; in this case by rotating the receivers 90° the direction for further movement could be obtained. When the center of the receivers is directly over the reflecting object the receivers could be rotated 360° with no change in sound travel time. When traveling in the direction of the reflecting object the difference in time of arrival of the sound pulse directly from the sound source and the sound pulse from the reflecting object, can also be used to estimate the distance to the reflecting object. The distance from the sound source and the receivers and the sound propagations characteristics of the water must be known.

The above objects and advantages of this invention will be more easily understood by those skilled in the art from the following detailed description of a preferred embodiment when taken in conjunction with the attached drawing in which.

Figure 1:
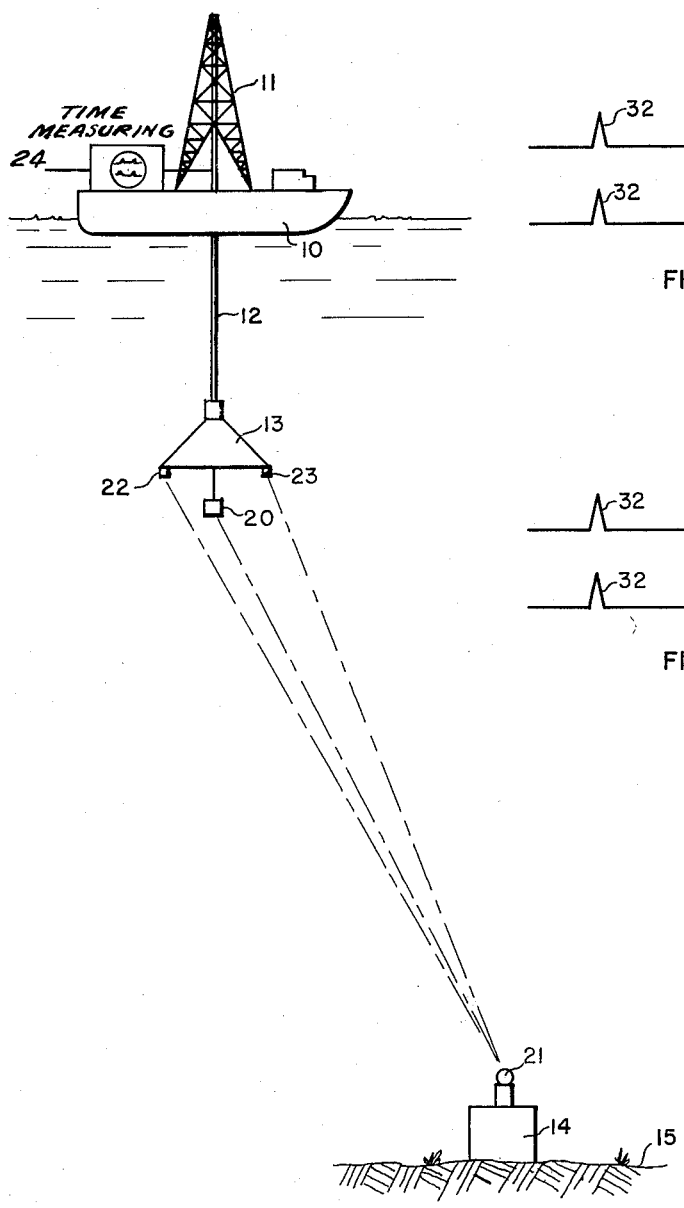
FIGURE 1 is a schematic representation of the invention applied to a drilling barge for locating a submerged wellhead; and, FIGURE 2A illustrates the type of signals that are received when the device is located at a position removed from the wellhead and the receivers are not aligned in a direction perpendicular to the wellhead.

Referring now to FIGURE 1 there is shown a drilling barge 10 floating on the surface of a body of water. The drilling barge is fitted with a drill rig having a derrick 11 and other equipment not shown. Extending through the floor of the drilling barge 10 is a drill string 12 supported from the derrick 11 by means well known in the art. Attached to the lower end of the drill string 12 is a wellhead connector 13. The wellhead connector 13 is adapted to fit over and connect with a submerged wellhead 14 that is located on the floor 15 of the body of water. The design and construction of the submerged wellhead and suitable connectors is well known to those skilled in the art.

Suspended below the wellhead connector at the center thereof is a source 20 of pulsed energy. The source of pulsed energy may take various forms, for example a magnetostrictive device that generates pulses of sonic energy when a current is caused to flow through a wire coiled around the magnetostrictive device. In addition, other forms of pulsed energy as for example electromagnetic energy may also be used. The only requirement for the pulsed energy source is that it be capable of traveling through the water and reflected from the object that is to be located. To insure that the pulsed energy is reflected from the object to be located, a reflector 21 may be disposed thereon. The reflecting device should be capable of reflecting the pulsed energy and may take various designs. For example, it may be a hollow sphere, an air bubble or a reflector formed from flat plates of metal capable of reflecting the pulsed energy. Also disposed on the lower surface of the wellhead connector 13 are two receivers 22 and 23. The receivers should be of a design capable of receiving the energy reflected from the reflector 21 and converting it to a related electrical signal. In addition, the receivers are located on diametrical opposite sides of the source 20 and spaced equal distance therefrom.

The sound source 20 and receivers 22 and 23 are connected to suitable time measuring apparatus 24 disposed on the drilling barge 10 by means of conductors not shown in FIGURE 1. The time-measuring apparatus may be one of various designs readily available on the commercial market. For example, the sound source and receivers may be coupled to a twin beam oscilloscope in a manner to deflect the oscilloscope beam upon the receiving of a direct sound impulse by the source 20 and a second deflection when the reflected energy is received by each of the receivers 22 and 23. In a similar manner, the sound source and receivers could be coupled to the recorders normally used in hydrophone-type depth sounding apparatus. In this type of recorder the triggering of the sound source would start the sweep of the recorder and then the receipt of the reflected energy by the receivers would be indicated by a flash on the sweep path of the recorder. Of course, regardless of the type of recording system used, it must be capable of recording the travel time for each of the receivers separately.

Figure 2A:
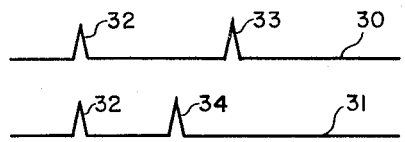
FIGURE 2B illustrates the type of signals that are received when the receivers are aligned perpendicular to the reflector or when the device is located in a position directly over the wellhead.
Figure 2B:
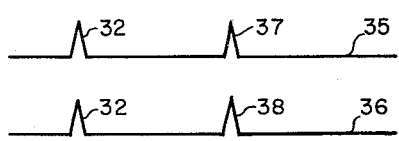

Referring now to FIGURE 2, there is shown in 2A two traces 30 and 31 that represent the travel time for the sound pulses as would be recorded on an oscilloscope. In the trace 30 the pulse 32 illustrates the generation of a sound impulse by the source 20 as indicated by the receiving of a direct pulse by the receiver 22 while the pulse 33 represents the receiving of the reflection of this pulse by the receiver 22. In the trace 31 the pulse 32 again illustrates the firing of the sound source while the pulse 34 illustrates the receiving of the reflection of the sound impulse by the receiver 23. As can be seen in FIGURE 1, the path from the source 20 to the reflector 21 and back to the receiver 22 is longer than the path from the source 20 to the reflector 21 and back to the receiver 23. Thus, the time interval as measured by the receiving of the reflected pulse by the receiver 22 will be longer than the time interval measured by the receiving of the impulse at the receiver 23. In FIGURE 2B the traces 35 and 36 illustrate the measurement of the time interval when the source 20 is positioned so that the receivers 22 and 23 are equal distance from the wellhead 14. In FIGURE 2B the pulses 32 again illustrate the generation of a sound impulse as indicated by the receiving of a direct pulse from the source 20 while the pulses 37 and 38 represent the receiving of the reflected impulse by the receivers 22 and 23 respectively.

The operation of the device is best understood by referring again to FIGURE 1. The device is first lowered from the drilling barge 10 into the water, the sound source 20 energized so that it periodically generates sound impulses. The receivers 22 and 23 are then rotated around the sound source 20 and the barge 10 is moved over the general area of the wellhead until reflected signals are obtained. When a reflected signal is received the receivers are rotated until the travel time of the sound to the two receivers are substantially equal as shown by the oscilloscope traces illustrated in FIGURE 2B. When the travel times are equal, it indicates that the sound source 10 is located in a position where each of the receivers are equal distance from the wellhead 14. At this position, the receivers are rotated 90° as for example by rotating the drill string 12. In this position the travel times are again observed. From this observation it is possible to determine whether the drilling barge 10 is to the right or left of the wellhead 14, depending upon which receiver indicates the longest travel time. After it is determined whether the drilling barge 10 is to the right or left of the wellhead 14 the drilling barge is then moved in the proper direction to bring the sound source 20 closer to the wellhead 14. During this travel, the travel time is again observed and the location at which they are substantially equally noted. At this location the sound source 20 should be directly above the wellhead 14.

Once the sound source is located above the wellhead 14 the wellhead connection 13 may be lowered and the travel time observed. As the wellhead connector 13 is lowered it can be easily determined whether the connector is aligned with the wellhead 14 by observing travel times. If the travel times remain equal it would indicate that the wellhead connector is aligned with the wellhead. If the travel times vary, it would indicate that the connector is displaced from the wellhead 14. The direction of the displacement can easily be determined by rotating the wellhead connector and the receivers 90 degrees and noting the change in the travel time. Once the direction of the displacement of the wellhead connector 13 from the wellhead 14 is determined, proper steps can be taken to move the drilling barge 10 back to an aligned position with the wellhead 14. Of course, during the lowering operation, the wellhead connector 13 and receivers should be rotated periodically to check for the proper alignment of the wellhead connector and the wellhead 14. As the wellhead connector approaches the wellhead, any slight misalignment of the two will result in a large difference in the travel times as measured by the two receivers. This will permit the operator to readily align the wellhead connector with the wellhead by moving the barge in the proper direction.

While but a single embodiment of this invention has been described in detail, it is of course susceptible to many modifications and changes within its broad spirit and scope. For example, various types of pulse energy sources may be used. In addition, various types of recording devices may be used to measure the time interval between the transmission of the pulse energy and the receiving of the reflection by the receivers. The important feature of this invention is the use of a pulse energy source and two or more receivers which are preferably spaced on diametrically opposite sides thereof and equally spaced therefrom. This feature in combination with the ability to rotate the receivers permits one to easily determine when the sound source is aligned with the object that is to be located. Likewise additional changes and modifications can be made in the details of the structure described above.

I claim as my invention:

1. A method for locating an underwater object, said method comprising:

generating a series of acoustical impulses at a point and transmitting said impulses to be reflected by said object;

receiving said reflected impulses at a pair of stations located on diametrically opposite sides of and equal distance from said point;

measuring the time required for said impulses to travel from said point of generation to said object and be reflected back to each of said stations;

moving said point of generation and said stations in unison until the measured travel times are substantially equal for all orientations of said point and said stations;

and then lowering the point at which said impulses are generated until it is in contact with the object.

2. A method for locating an underwater object, said method comprising:

generating at a known location a series of energy pulses capable of traveling through the water and being reflected from the object;

receiving the energy pulses reflected from said object at two stations located equal distances on opposite sides of said location;

measuring the time required for the energy pulses to travel from said location and be reflected back to each of said stations;

moving the location at which said energy pulses are generated until the measured travel times for both stations are equal;

rotating the stations 90 degrees about the location at which said energy pulses are generated and measuring the time required for the energy pulses to travel from said location and be reflected back to each of said locations;

determining which travel time is the shortest;

moving the locations at which said energy pulses are generated along an azimuth formed by a line joining said two receivers and in a direction towards the receiver having the shortest travel time;

continuing to move the location at which the pulses are generated until the measured travel times remain equal regardless of the rotation of the stations; and lowering the location at which the energy pulses are generated until the location is adjacent to said object.

References Cited by the Examiner
UNITED STATES PATENTS

| | | | |
|---|---|---|---|
| 1,886,914 | 11/1932 | Slichter | 340—6 X |
| 1,892,431 | 12/1932 | Hammond | 340—3 X |
| 2,520,520 | 8/1950 | Woodard | 340—5 X |
| 2,530,528 | 11/1950 | Kreer | 340—6 |
| 2,629,082 | 2/1953 | Hare | 340—16 X |
| 3,024,441 | 3/1962 | Saxton | 340—6 |
| 3,032,105 | 5/1962 | Reistle | 166—46 |
| 3,032,744 | 5/1962 | Davis | 340—16 |

CHESTER L. JUSTUS, *Primary Examiner.*